United States Patent
Ivanov et al.

(10) Patent No.: US 11,704,137 B2
(45) Date of Patent: Jul. 18, 2023

(54) SYSTEMS AND METHODS FOR VALIDATING LOADING OF CONTENT ON USER INTERFACE

(71) Applicant: BANK OF MONTREAL, Toronto (CA)

(72) Inventors: Deian Ivanov, Toronto (CA); Andrey Malashenko, Toronto (CA)

(73) Assignee: BANK OF MONTREAL, Toronto (CA)

( * ) Notice: Subject to any disclaimer, the term of this patent is extended or adjusted under 35 U.S.C. 154(b) by 0 days.

(21) Appl. No.: 16/790,604

(22) Filed: Feb. 13, 2020

(65) Prior Publication Data
US 2020/0272483 A1    Aug. 27, 2020

Related U.S. Application Data

(60) Provisional application No. 62/810,855, filed on Feb. 26, 2019.

(51) Int. Cl.
*G06F 9/451* (2018.01)
*G06F 16/957* (2019.01)
(Continued)

(52) U.S. Cl.
CPC ............ *G06F 9/451* (2018.02); *G06F 3/1415* (2013.01); *G06F 11/3006* (2013.01);
(Continued)

(58) Field of Classification Search
CPC ............ G06F 11/3006; G06F 11/3055; G06F 11/328; G06F 11/324; G06F 11/3089;
(Continued)

(56) References Cited

U.S. PATENT DOCUMENTS 6,229,921 B1 * 5/2001 Wenzel ................ G06T 7/248
382/209
8,971,642 B2 * 3/2015 Dhanda ................ G06F 16/958
382/218
(Continued)

FOREIGN PATENT DOCUMENTS

CN    201585139 U  *  9/2010
KR    2001091681 A  *  10/2001

OTHER PUBLICATIONS

Examination Report on CA 3072806 dated Apr. 20, 2021 (4 pages).
(Continued)

*Primary Examiner* — Kieu D Vu
*Assistant Examiner* — Blaine T Basom
(74) *Attorney, Agent, or Firm* — Foley & Lardner LLP (57) ABSTRACT

Disclosed herein are systems and methods for validating loading of complete electronic form on a user interface of an electronic device. When the electronic form is displayed on the user interface, a server obtains current pixel data from the electronic device. The server then compares the current pixel data with prior pixel data determined from a pixel map. The pixel map is associated with the electronic form and the electronic device. When the current pixel data does not match with the prior pixel data, the server concludes that the electronic form is not fully displayed on the user interface. The server then executes a protocol for display of complete electronic form on the user interface.

20 Claims, 7 Drawing Sheets

(51) Int. Cl.
  *G06F 16/958* (2019.01)
  *G06F 11/30* (2006.01)
  *G06F 3/14* (2006.01)

(52) U.S. Cl.
  CPC ...... *G06F 11/3055* (2013.01); *G06F 11/3089* (2013.01); *G06F 16/958* (2019.01); *G06F 16/9577* (2019.01)

(58) Field of Classification Search
  CPC .. G06F 11/3438; G06F 9/451; G06F 16/9577; G06F 16/958; G06F 3/1415; G06T 7/74; G06T 2200/24; G06K 9/6202; G06K 9/6215; H04L 67/22
  See application file for complete search history.

(56) References Cited

U.S. PATENT DOCUMENTS

| | | | | |
|---|---|---|---|---|
| 9,164,874 | B1* | 10/2015 | Tomay | G06F 11/3672 |
| 9,213,625 | B1* | 12/2015 | Schrage | G06F 11/3688 |
| 9,396,088 | B2* | 7/2016 | Liang | G06F 11/323 |
| 9,575,941 | B1* | 2/2017 | Westbrook | G06F 40/117 |
| 9,600,400 | B1* | 3/2017 | McDowell | G06F 11/3428 |
| 9,852,049 | B2* | 12/2017 | Hey | G06F 11/3668 |
| 10,474,481 | B2* | 11/2019 | Snir | G06F 40/106 |
| 10,831,991 | B1* | 11/2020 | Hansen | G06F 40/14 |
| 2011/0302235 | A1* | 12/2011 | Monk | H04L 67/02 709/203 |
| 2012/0051634 | A1* | 3/2012 | Chong | G06K 9/4652 382/165 |
| 2012/0198351 | A1* | 8/2012 | Lee | G06F 11/3688 715/744 |
| 2014/0105491 | A1* | 4/2014 | Hayek | G06F 16/958 382/221 |
| 2014/0129914 | A1* | 5/2014 | Agarwal | G06F 40/174 715/226 |
| 2016/0189003 | A1* | 6/2016 | Liu | G06K 9/62 382/165 |
| 2017/0220306 | A1* | 8/2017 | Price | G06F 16/9577 |
| 2018/0174330 | A1* | 6/2018 | Chen | G06F 8/20 |
| 2018/0329801 | A1* | 11/2018 | McKee | G06F 11/0709 |

OTHER PUBLICATIONS

Examination Report for CA 3072806 dated Mar. 2, 2022 (5 pages).
Examination Report for CA App. 3,072,806 dated Jan. 4, 2023 (6 pages).

* cited by examiner

```
┌─────────────────────────────────────────────────────────────┐
│ Receive indication that application has executed            │
│ protocol on electronic client device 202                    │
└─────────────────────────────────────────────────────────────┘
                              │
                              ▼
┌─────────────────────────────────────────────────────────────┐
│ Retrieve identification data of electronic client device    │
│ 204                                                         │
└─────────────────────────────────────────────────────────────┘
                              │
                              ▼
┌─────────────────────────────────────────────────────────────┐
│ Determine pixel map corresponding to display size of        │
│ electronic client device 206                                │
└─────────────────────────────────────────────────────────────┘
                              │
                              ▼
┌─────────────────────────────────────────────────────────────┐
│ Retrieve pixel status of display of electronic client       │
│ device 208                                                  │
└─────────────────────────────────────────────────────────────┘
                              │
                              ▼
┌─────────────────────────────────────────────────────────────┐
│ Compare received pixels with retrieved pixel map 210        │
└─────────────────────────────────────────────────────────────┘
                              │
                              ▼
┌─────────────────────────────────────────────────────────────┐
│ Instruct application to execute second protocol when        │
│ pixels status received do not match the pixel map 212       │
└─────────────────────────────────────────────────────────────┘
```

| Pixel 318 | Coordinates 320 | Color 322 |
|---|---|---|
| 302 | 31, 92 | Black |
| 304 | 5, 81 | White |
| 306 | 50, 79 | Yellow |
| 308 | 72, 48 | Black |
| 310 | 8, 50 | Black |
| 312 | 10, 21 | Black |
| 314 | 70, 34 | White |

SYSTEMS AND METHODS FOR VALIDATING LOADING OF CONTENT ON USER INTERFACE

CROSS-REFERENCE TO RELATED APPLICATIONS

This application claims priority to U.S. Provisional Patent Application No. 62/810,855, filed Feb. 26, 2019, which is incorporated herein by reference in its entirety.

TECHNICAL FIELD

The subject matter described herein relates generally to validation systems, and more specifically directed towards systems and methods for validating loading of complete electronic data on a user interface of an electronic device.

BACKGROUND

With the advance of browser technologies and World Wide Web infrastructures, electronic content is presented as web pages on the Internet via a browser. When a user may execute the browser on a computing device, such as a laptop computer or a smart phone, to access a webpage, such as the webpage having an electronic form, the browser must load the electronic form to be displayed on the computing device. The process of loading the electronic form on the webpage is implemented by downloading the relevant electronic form from a webserver before the webpage is displayed on the computing device operated by the user. However, due to various technical problems (e.g., bandwidth glitches associated with the Internet and limited screen size of the computing device), the entire content of the electronic form may not be fully displayed on a user interface of the computing device. Consequently, the user is unable to access all data fields of the electronic form, which may disrupt the form completion process and create a negative user experience. Furthermore, while the electronic form is not displayed on the computing device, the webserver instructing the browser to display the electronic form may not be able to remedy this technical challenge because the webserver may not be notified of the problem. The user may need to restart the process from the beginning when the webpage fails to correctly load.

SUMMARY

For the aforementioned reasons, there is a need to monitor whether various protocols instructing computing devices to display graphical elements are executed correctly by the computing devices, thereby allowing webpages to properly load or identify those webpages that have not properly loaded. What is therefore desired are systems and methods for validating whether complete content of an electronic form is fully displayed on a user interface of a computing device. What is further desired are systems and methods for enabling loading of the complete content of the electronic form on the user interface of the computing device upon determining that the electronic form in not fully displayed on the user interface.

In an embodiment, a method may include receiving, by a server from an application executing on an electronic client device having a display area, an indication of execution of a first protocol configured to display a media element on a webpage displayed on the electronic client device. The method may further include retrieving, by the server from a database, a pixel map corresponding to the media element, the pixel map indicating a pixel status of each pixel within a set of pixels of the display area when the media element is displayed, the pixel map further corresponding to a dimensional attribute of the display area. The method may further include generating, by the server, an instruction to transmit a pixel status of at least one pixel within the display area to the electronic client device. The method may further include, upon transmitting the instruction to the electronic client device, receiving, by the server, the pixel status of the at least one pixel. The method may further include, upon determining that the pixel status does not match a pixel status of a corresponding pixel within the pixel map, instructing, by the server, the application to execute a second protocol configured to display the media element on a webpage displayed on the electronic client device.

In another embodiment, a system may include a database, an electronic client device, and a server. The server is configured to receive from an application executing on the electronic client device having a display area, an indication of execution of a first protocol configured to display a media element on a webpage displayed on the electronic client device; retrieve from the database a pixel map corresponding to the media element, the pixel map indicating a pixel status of each pixel within a set of pixels of the display area when the media element is displayed, the pixel map further corresponding to a dimensional attribute of the display area; generate an instruction to transmit a pixel status of at least one pixel within the display area to the electronic client device; upon transmitting the instruction to the electronic client device, receive the pixel status of the at least one pixel; and upon determining that the pixel status does not match a pixel status of a corresponding pixel within the pixel map, instruct the application to execute a second protocol configured to display the media element on a webpage displayed on the electronic client device.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments that, together with the specification, explain the subject matter.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for validating loading of complete electronic data on a user interface of an electronic device. In operation, a user may execute a request using the electronic device to publish an electronic form on its user interface. The electronic device may publish the electronic form containing the electronic data on the user interface of the electronic device. A server may determine whether the electronic form is fully displayed on the user interface of the electronic device. The server may extract and/or retrieve current pixel data from the electronic device. The current pixel data may be associated with the electronic form displayed on the user interface of the electronic device. The server may retrieve a pixel map from a database. The pixel map may store prior pixel data. The prior pixel data is associated with the electronic form displayed on the user interface of the electronic device. The server may compare the current pixel data and the prior pixel data. When the current pixel data does not match with the prior pixel data, the server may conclude that the electronic form is not fully displayed on the user interface. The server may generate instructions to publish the complete electronic document on the user interface. The server may execute the instructions to publish the complete electronic document on the user interface. Once the complete electronic document may be published on the user interface, the user may input answers in various data fields of the electronic form. The server may store answers submitted by the user in a database.

Figure 1:
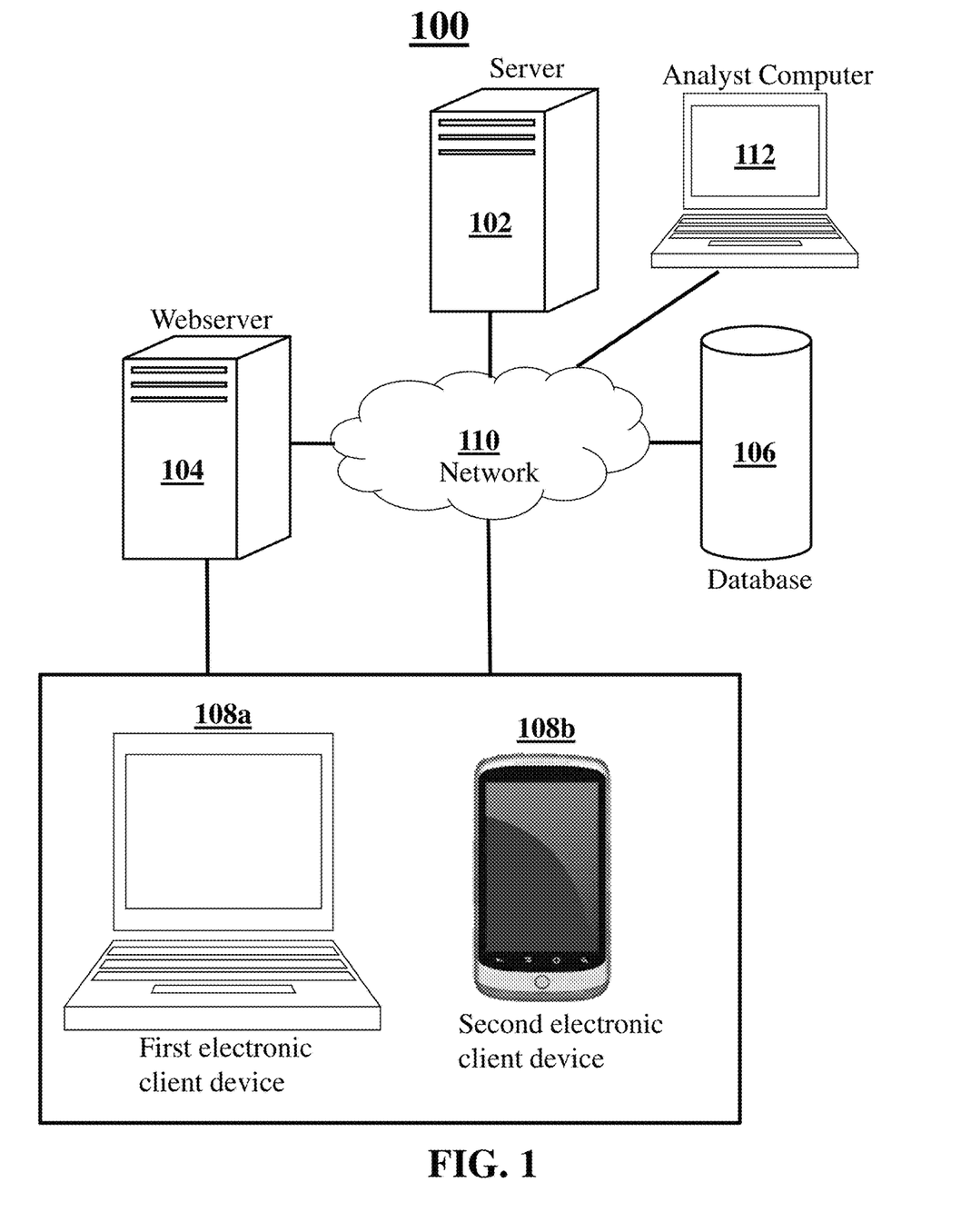
FIG. 1 shows components of a system for validating loading of entire content on a graphical user interface of an electronic device, according to an embodiment.

FIG. 1 shows components of a system 100. The system 100 may include a server 102, a webserver 104, a database 106, electronic client devices 108 (such as, a first electronic client device 108a and a second electronic client device 108b), and an analyst computer 112. The server 102, the webserver 104, the database 106, the electronic client devices 108, and the analyst computer 112 may be connected to each other through a network 110. The network 110 may include, but is not limited to, private or public local area network, wireless local area network, metropolitan area network, wide-area network, and the Internet. The network 110 may further include both wired and wireless communications, according to one or more standards, via one or more transport mediums. The communication over the network 110 may be performed in accordance with various communication protocols, such as, transmission control protocol and internet protocol, user datagram protocol, and institute of electrical and electronics engineers communication protocols. The network 110 may further include wireless communications, according to Bluetooth specification sets, or another standard or proprietary wireless communication protocol. The network 110 may further include communications over a cellular network, including, for example, a global system for mobile communications, code division multiple access, and enhanced data for global evolution network.

The system 100 is described in a context of computer-executable instructions, such as program modules, being executed by server computers, such as the server 102. The server 102 may operate various software programs and algorithms, which may perform various computer-based tasks. The features of the system 100 may be practiced either in a single computing device, or in a distributed computing environment, where various computer-based tasks may be performed by processing devices, which may be linked through the network 110. In the distributed computing environment, the various program modules may be located in both local and remote computer storage media including memory storage devices.

In operation, the electronic client device 108 may generate notifications. The notifications may be in form of electronic messages and contain indicators corresponding to pixel data. The pixel data may be associated with presentation of media elements, such as various data fields of a first electronic form, on a user interface of the electronic client device 108. The media element may be a field, a set of fields, an image, a video, a section of a form or webpage, or other graphical content. The media element may receive an input from the user. The notifications may include identifiers associated with the electronic client device 108 and a user operating the electronic client device 108. Hereinafter, the term "customers," "clients," and "users" may be interchangeably used. The notifications may be stored into the database 106 to await further processing. The server 102 may process information within the notifications. Using the identifiers associated with the electronic client device 108 and/or the user, the server 102 may retrieve a pixel map from the database 106. The pixel map may include pixel data representing pixels in a single frame in a still, computer implemented visual image when various electronic forms including the first electronic form may be presented on an electronic device similar or identical to the electronic client device 108.

Each pixel may represent a point in the visual image, and may include data representing color and intensity of the pixel. The server 102 may execute various computer-based processes using the notifications and the pixel map, such as determining whether the pixel data in the notifications matches a corresponding pixel in the pixel map. Based on the pixel matching results, the server 102 may determine whether the complete first electronic form is displayed on the user interface of the electronic client device 108. For instance, when a first pixel at a first location on the user interface of the electronic client device 108 received in the notification from the electronic client device 108 does not match a corresponding pixel at a corresponding location in the pixel map associated with the similar electronic device displaying the first electronic form, the server 102 may determine that the first electronic form is not fully displayed on the user interface of the electronic client device 108. The server 102 may then determine and store a list of media elements or a portion of the electronic form that is not displayed on the user interface of the electronic client device 108.

The server 102 may generate and implement instructions/commands that may enable display of all media elements on the electronic client device 108. Upon display of all the media elements on the user interface of the electronic client device 108, the server 102 may determine that the electronic form is fully displayed on the user interface of the electronic client device 108. The server 102 may update notification records in the database 106 specifying that display problems associated with the notifications received from the electronic client device 106 has been processed and resolved.

Analyst computers 112 may query and fetch the notification records from the database 106, and then present the notifications to be addressed and re-checked by an analyst according to a priority level of the respective notifications. Periodically or in response to triggering condition, the server 102 may update the priority of the notifications in the database 106 as more notifications are received from various electronic devices. In response, the analyst queue may be adjusted to reflect the updated priority of the notifications in the database 106. The analyst computer 112 may generate an analyst queue model that includes queues containing one or more notifications. The queues may be populated from the notification records stored in the database 106 received from an automated system 100 that is configured to track and monitor loading of content of the electronic form on the user interface of the electronic client device 108. Each queue generated by the analyst computer 112 may contain the notifications of a certain priority from various users. A priority-level may be determined by computing devices of the automated system 100 based on a type of the electronic form (such as a financial services form or a ticket booking form). The electronic form containing sensitive data may be given priority. In yet another alternative embodiment, a queue may contain the notifications based on other attributes, such as the user status information (a top level client or a regular level client). Based on the priority, the analyst computer 112 may process the notification records and re-validate whether the electronic form is fully displayed on the user interface of the electronic client device 108. The processing of the notification records may include matching a second pixel at a second location on the user interface of the electronic client device 108 received in the notification from the electronic client device 108 with a corresponding pixel at a corresponding location in the pixel map associated with the similar electronic device displaying the first electronic form. Based on affirmative matching results, the analyst computer 112 may re-validate that the electronic form is fully displayed on the user interface of the electronic client device 108. The user may then provide answers to various questions in the data fields of the electronic form. The inputted data by the user is stored in the database 106.

A server 102 may be a computing device comprising a processor and non-transitory machine-readable storage medium and capable of performing various validation tasks and authentication processes described herein during execution. Non-limiting examples of the server 102 may include a desktop computer, a server computer, a laptop computer, a tablet computer, and the like. For ease of explanation, FIG. 1 shows a single computing device functioning as the server 102. However, it should be appreciated that some embodiments may comprise any number of computing devices capable of performing the various tasks described herein.

The server 102 may be coupled to a webserver 104 and/or an electronic client device 108 via one or more internal or external networks 110. The server 102 may further be in communication with an application running on the electronic client device 108 via the network 110. The application may be an executable file application. The executable file application may be installed in a memory of the electronic client device 108. The executable file application may be installed in a browser application of the electronic client device 108. A processor of the electronic client device 108 may execute the executable file application. The executable file application may track web activity of the user. The web activity of the user may be tracked based on the uniform resource locator (URL) of the webpage being accessed by the user. In some embodiments, the web activity of the user may be tracked based on content of the website being accessed. In some embodiments, the web activity of the user may be tracked based on a search query for assisting online web activity. While the non-limiting example described herein recites the memory having the executable file application, it is intended that the systems and methods can be integrated on a different component that uses the functionality of the executable file application.

The server 102 may communicate with the executable file application to receive tracking data associated with the web activity of the user on the electronic client device 108. In some embodiments, the server 102 may transmit a request to the executable file application to receive the tracking data. In some embodiments, the executable file application may periodically transmit the tracking data to the server 102. The tracking data may include notifications such as electronic messages. The electronic messages may include indicators associated with the execution of a protocol on the electronic client device 108. The protocol may be a first protocol. The first protocol may be a first series of instructions. The execution of the first series of instructions may result in the display of a first website on a user interface of the electronic client device 108. The webserver 104 may operate the first website and contain all the data of the first website. The first website will present a webpage on the user interface of the electronic client device 108. The webpage may present a media element. The media element may correspond to a first electronic form having one or more data fields. The first electronic form may be a form for opening a bank account, a form for applying a loan application, a form for purchasing an airline ticket, etc.

The electronic messages may further include identifiers associated with the user and the electronic client device 108. The identifiers associated with the user may include personal data of the user such as a name of the user and username of the user, user profile containing information associated with a number of electronic devices being operated and registered by the user, a financial history of the user, social media data associated with user, a list of electronic documents previously accessed by the user, and a list of social media websites being operated by the user. The identifiers associated with the electronic client device 108 may include a device name, a device number, a size of the user interface of the electronic client device 108, a resolution of the user interface of the electronic client device 108, and a type of the user interface of the electronic client device 108.

In response to receiving and processing the information within the electronic messages from the electronic client device 108, the server 102 may generate an instruction and transmit the instruction to the electronic client device 108. The instruction may contain a request to transmit pixel data within the display area of the user interface of the electronic client device 108. The pixel data may include a pixel status of at least one pixel within the display area of the user interface of the electronic client device 108. The display area may show the first electronic form as data (e.g., image, XML, HTML) being presented on the user interface. The data may include a two-dimensional array or a three-dimensional array of pixels. Each pixel is considered to be the equivalent of a character in the electronic form such as a first electronic form. Each pixel represents a segment (e.g., a point) in the first electronic form, and includes data representing, for example, the color and intensity of the pixel.

The electronic client device 108 on receiving the instruction may then process the request contained within the instruction. The electronic client device 108 may execute one or more pixel calculation algorithms to calculate the pixel data corresponding to the first electronic form. The pixel data of a rendered first electronic form includes data values describing attributes of a pixel. For instance, the pixel data may include intensity value for color components. The pixel data may further include depth value for every pixel location in the electronic form. In some embodiments, a processor of the electronic client device 108 may retrieve the pixel data stored in an internal memory of the electronic client device 108. In some embodiments, a processor of the electronic client device 108 may retrieve the pixel data from an external database containing information associated with the electronic client device 108. The electronic client device 108 may then transmit the pixel data to the server 102.

The server 102 may generate and transmit a request to the database 106 to retrieve a pixel map corresponding to the first electronic form. The server 102 may include identification data of the user and the electronic client device 108 within the request. Based on the identification data of the user and/or the electronic client device 108, a processor associated with the database 106 may identify the pixel map. The pixel map may indicate a pixel status of each pixel within a set of pixels at each pixel location of the display area when the first electronic form is displayed on the user interface of the electronic client device 108.

The server 102 may compare the pixel data received from the electronic client device 108 against information contained within the pixel map retrieved from the database 106. During the comparison operation, the server 102 may randomly select pixel status of one or more pixels at one or more pixel locations within the pixel data. The server 102 may then compare the pixel status of the one or more pixels at the one or more pixel locations with corresponding pixel status of corresponding one or more pixels at corresponding one or more pixel locations within the pixel map. For example, the server 102 may randomly select a first pixel at a first location having a first pixel status and a second pixel at a second location having a second pixel status from the pixel data received from the electronic client device 108. The server 102 may then retrieve pixel status information associated with the first pixel at the first location and the second pixel at the second location from the pixel map. Upon determining that both the first pixel status and the second pixel status match corresponding pixel status obtained from the pixel map, the server 102 may determine that the correct and complete first electronic form is displayed on the user interface of the electronic client device 108. Upon determining that the first and second pixel status does not match the pixel status of corresponding first and second pixels within the pixel map, the server 102 may then generate and execute instructions to display the full first electronic form on the webpage displayed on the electronic client device 108. For example, the server 102 may communicate with the webserver 104 to publish the full first electronic form on the webpage displayed on the electronic client device 108. The webserver 104 may then execute a new protocol or a new set of instructions to publish and display the full first electronic form on the webpage displayed on the electronic client device 108. The webserver 104 on reloading and publishing the full first electronic form on the webpage displayed on the electronic client device 108 may transmit an electronic message to the server 102. The electronic message may contain a report that the webserver 104 reloaded and published the full first electronic form on the webpage displayed on the electronic client device 108. The server 102 on receiving the electronic message from the webserver 104 may again execute the pixel matching method to validate that the correct and complete first electronic form is displayed on the user interface of the electronic client device 108. For instance, when the server 102 receives the electronic message from the webserver 104, current pixel data and content data of the first electronic form displayed on the electronic client device 108 is extracted and compared with that of the prior pixel and content data stored in the pixel map corresponding to the first electronic form based on a predetermined similarity measure. The server 102 considers the current pixels to be matching to the prior pixels only if the current and prior pixels being compared contain identical data. In some embodiments, the server 102 considers the current pixel at a first location and the prior pixel at the first location to be a match even if they are not identical, provided the prior pixel falls within a preset tolerance of the current pixel. When there is match between the current pixels and the prior pixels, the server 102 may conclude that the correct and full first electronic form is displayed on the user interface of the electronic client device 108.

A webserver 104 may be hosting a website accessible to an electronic client device 108 via a network 110 such as the Internet. The website may display webpages containing various electronic forms. In some embodiments, the webserver 104 may be hosting a web application accessible to the electronic client device 108 via the Internet. In some embodiments, the webserver 104 may be hosting various protocols accessible to the electronic client device 108 via the Internet. The webserver 104 may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single webserver 104, one having skill in the art would appreciate that in some embodiments the webserver 104 may include any number of computing devices operating in a distributed computing environment.

The webserver 104 may execute software applications configured to host a web application or a website, which may generate and serve various webpages to the electronic client device 108. The web application may be used to generate and access data such as a first electronic form stored on a database 106. The first electronic form may be a form to open a bank account.

The webserver 104 may generate a record for an interaction between the electronic client device 108 and the webserver 104. The record may contain data fields related to the interaction, such as an identifier, a timestamp, a user identifier, and source device information identifying the electronic client device 108 (e.g., IP address, MAC address). The webserver 104 may store the records locally or in a database 106. The server 102 may access the records from the database 106. The webserver 104 may capture data for the interaction at different times of the interactions, such as capturing the electronic client device 108 information from header portions of IP packets, or the user identifier information from an authentication attempt.

The webserver 104 may be configured to require user authentication based upon a set of user authorization credentials (e.g., username, password, biometrics, cryptographic certificate). In such implementations, the webserver 104 may access the database 106 configured to store user credentials, which the webserver 104 may be configured to reference in order to determine whether a set of entered credentials purportedly validating the user match an appropriate set of credentials that identify and authenticate the user. Similarly, in some implementations, the webserver 104 may generate and serve webpages presenting electronic forms to the electronic client device 108 based upon a user profile within the system 100. In such implementations, the user profile may be defined by data fields in the user records stored in the database 106, and authentication of the user and user profile may be conducted by the webserver 104 by executing an access directory protocol. The webserver 104 may then be instructed to generate webpage content, access or generate data such as the electronic forms stored in the database 106, according to a user request or the user profile defined in the user record in the database 106.

As the webserver 104 may require the user to authenticate using credentials that identify the user as a valid client of the system 100, the webserver 104 may generate notifications related to user's interactions with the webpage hosted by the webserver 104. For example, the webserver 104 may generate the notifications associated with the execution of protocols and display of media elements such as input data fields of electronic forms on the webpage displayed on the electronic client device 108. As another example, the webserver 104 may generate the notifications when the user performs or otherwise requests actions such as inputting answers into the data fields of the electronic form displayed on the electronic client device 108. The webserver 104 may store the notifications locally or in a database 106. The server 102 may access the notifications from the database 106 for further processing to validate whether the complete electronic form is displayed on the user interface of the electronic client device 108. For instance, the server 102 may compare current pixel data at a first location in the user interface retrieved from the electronic client device 108 with corresponding pixel data in the first location stored within a pixel map, and upon positive comparison outcome may validate that the complete electronic form is displayed on the user interface of the electronic client device 108.

An electronic client device 108 may be a computing and/or telecommunication device comprising a processor and capable of performing the various tasks and processes described herein, such as accessing a webserver 104 and providing a graphical user interface to a user to interact with a customer-centric web application and various protocols. The web application may present webpages displaying various electronic forms. Non-limiting examples of the electronic client device 108 may include a client computer 108a (e.g., desktop, laptop, server, tablet), a telephone 108b (e.g., cellular telephone, smartphone), or any other telecommunications or computing device used to communicate with system services.

The electronic client device 108 may interact with the server 102 via the webserver 104. In some embodiments, the electronic client device 108 may interact with the webserver 104 via the server 102. In some embodiments, the electronic client device 108 may directly interact with the server 102. The electronic client device 108 may execute an Internet browser or a local web application that access the webserver 104 in order to issue requests or instructions to the server 102 to access the electronic content of the system 100. The electronic client device 108 may transmit credentials from the user inputs to the webserver 104, from which the webserver 104 may authenticate the user and, in some implementations, determine a user profile. The electronic client device 108 may comprise any number of input devices configured to receive any number of data inputs (e.g., mouse, keyboard, touchscreen, stylus), including various types of data inputs allowing for authentication, e.g., username, passwords, certificates, biometrics.

As an example of the electronic client device 108 operation, the electronic client device 108 may execute an Internet browser that accesses a webserver 104 hosting a web application that allows the user to access various electronic forms. The electronic forms may include a form to open a bank account, a form to make a hotel reservation, etc. Using the electronic client device 108, the user may select a particular electronic form on the user-centric website or web application. In response to the user selection, the electronic form is then downloaded from the webserver 104 and displayed on the user interface of the electronic client device 108. The server 102 may then execute various authentication techniques to validate whether the complete electronic form is displayed on the user interface of the electronic client device 108. The authentication techniques may include a pixel data matching method where pixel data from the user interface is captured, and compared against pixel information stored within a pixel map. For example, the server 102 may compare the pixel data of an input form representing the electronic form displayed on the user interface of the electronic client device 108 with the corresponding pixel data of the electronic form stored in the database 106. The server 102 may compare each pixel data of the input form with the corresponding pixel data of the stored electronic form. A match occurs when each pixel data of the input image is similar the corresponding pixel data of a stored electronic form. Upon the positive matching outcome, the server 102 may validate that the electronic form is fully displayed on the user interface of the electronic client device 108.

As the operation proceeds, the user of the electronic client device 108 may then have access to all content of the electronic form. The user may then provide answers to various questions in the electronic form. The user may then upload the electronic form and machine-readable computer files (e.g., PDF, DOC, XLS) containing various other information of the user. All files may be stored into document records in the database 106. The electronic client device 108 may issue reports to the server 102 via the webpages generated by the webserver 104, which then instruct the server 102 to perform various tasks, such as determining whether all questions have been answered in the uploaded electronic form.

Analyst computers 112 may be computing devices such as laptops, desktops, servers, tablets, and smartphones that analysts may use to generate a pixel map. The analyst computer 112 may be coupled via one or more internal or external networks 110 to the database 106. Software executed by the analyst computer 112 permits an analyst to generate a pixel map for each electronic form displayed on various different types of the electronic client devices 108, and then store all the pixel maps in the database 106. The pixel map include a pixel status of each pixel within a set of pixels of a display area of a particular electronic client device 108 when a particular electronic form is displayed on a user interface of the particular electronic client device 108. The pixel status of each pixel of the display area of the particular electronic client device 108 may vary depending on a dimensional attribute of the display area of the particular electronic client device 108. For instance, a pixel status of each pixel at each location when a first electronic form is displayed on a first desktop computer is different from a pixel status of each pixel at each location when the first electronic form is displayed on a first mobile device as the size of the display screen of the first desktop computer is different from the first mobile device. Also, the pixel status of each pixel when a first electronic form is displayed on a first desktop computer is different from a pixel status of each pixel when the first electronic form is displayed on a second desktop computer when size and resolution of the display screen of the first desktop computer is different from the second desktop computer. Accordingly, the pixel status of each pixel may vary depending on a type and a size of the display screen of the particular electronic client device 108. The pixel map containing the pixel data is stored into the database 106.

The pixel map may further include content associated with the color data of the first electronic form, texture data of the first electronic form, shape and position data of objects within the first electronic form, and other feature data of the first electronic form. In addition, the content within the pixel map may also include text description data of the first electronic form. The analyst computer 112 may execute various algorithms to extract/retrieve content such as color data, texture data, text description data from the first electronic form, and then store all the content data in the pixel map corresponding to the first electronic form. The content data and the pixel data of the first electronic form may be logically linked, and then stored in the pixel map. In some embodiments, the content data of the first electronic form may be stored in the database 106 of the system 100, in association with the pixel data of the respective first electronic form. Within the database 106, the content data and the pixel data may be linked to generate a pixel map. The pixel map may then be stored separately within the database 106.

A database 106 may be hosted on one or more server computing devices. The database 106 may store data records associated with various aspects of the application services offered to end clients. The database 106 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the server 102. Non-limiting examples of what may be stored in the database 106 may include user records that may comprise data fields describing users, e.g., client data, such as client credentials (e.g., username, passwords, biometrics, encryption certificates), electronic forms, pixel maps, document records that may comprise machine-readable computer files (e.g., word processing files), parsed portions of such computer files, or metadata associated with computer files; and web application data that may include software instructions executed by the server 102 or data used by the such applications executed by the server 102. The database 106 may be hosted on any number of computing devices comprising a non-transitory machine-readable storage medium and capable of performing the various tasks described herein. As shown in FIG. 1, the database 106 may be accessed by the server 102 and other servers and devices of the system 100 via one or more networks 110. The database 106 may be hosted on the same physical computing device functioning as the server 102 and/or functioning as other servers and devices of the system 100.

Figure 2:
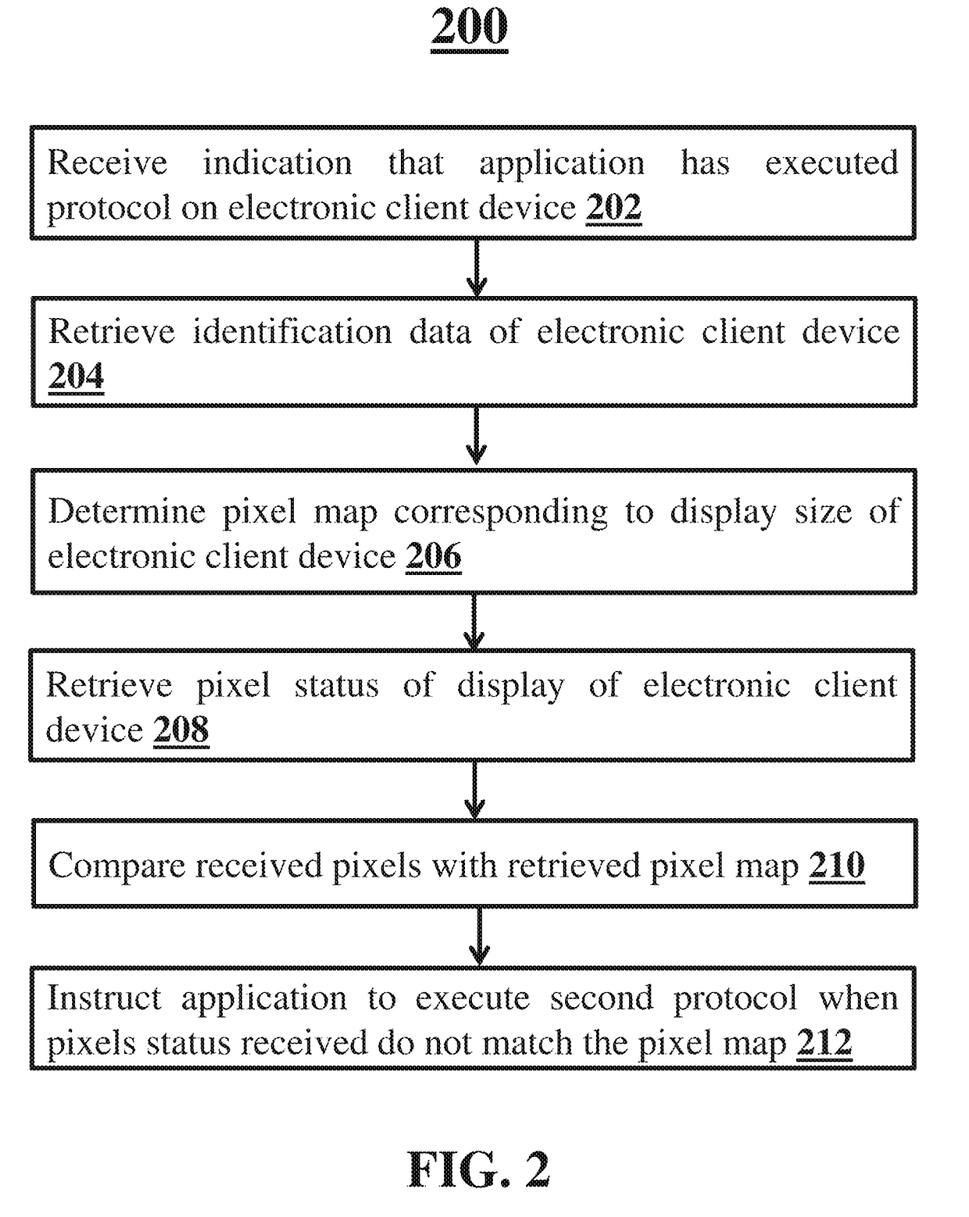
FIG. 2 shows a method for validating loading of entire content on a graphical user interface of an electronic device, according to an embodiment.

FIG. 2 shows execution steps of validating loading of entire content on a graphical user interface of an electronic device, according to a method 200. The method 200 shown in FIG. 2 comprises execution steps 202, 204, 206, 208, 210, and 212. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 200 of FIG. 2 is described as being executed by a single server computer in this embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the server described herein.

In a first step 202, the server may receive a notification from an application executing on an electronic client device operated by a user. The application may be a software application of a first company installed on the electronic client device. The software application may be configured to track user activity on the electronic client device, and then generate the notification containing data associated with the user activity. The software application may also be configured to track all web activity on the electronic client device, and then generate the notification containing data associated with the web activity such as browsing of different websites and webpages. For instance, the notification may correspond to indication of execution of a first protocol on the electronic client device. The first protocol may be a series of instructions executed to present a first website. The first website may display a media element on a webpage displayed on the electronic client device. The media element may be an electronic form having one or more data fields. The electronic form may be a form for opening a bank account.

In a next step 204, the server may retrieve identification data associated with the user of the electronic client device and the electronic client device from a database. The database may store records associated with various users of the system and their associated electronic client devices. The identification data associated with the user may include user name and user profile data. The user profile data may include information such as a list of existing accounts of the user and a list of electronic documents already accessed by the user. The identification data associated with the electronic client device may include a client device name, a client device number, the size of display area or screen of the electronic client device, the resolution of the display area or screen of the electronic client device, and other information associated with the display area or screen of the electronic client device. In some embodiments, the server may query a unique identifier (e.g., international mobile equipment identity number or IP address) of the electronic device, and retrieve the above-described data using the unique identifier of the electronic device.

In a next step 206, using the identification data associated with the user and/or the electronic client device, the server may retrieve a pixel map from a database. The pixel map may be associated with the electronic form displayed on the electronic client device. The pixel map may indicate a pixel status of each pixel within a set of pixels of the display area of the electronic client device when the electronic form is displayed on the user interface of the electronic client device. The pixel status of each pixel may be based on each pixel location in the display area and a dimensional attribute such as a size and a resolution of the display area of the electronic client device.

The database may store various pixel maps corresponding to various sizes of display screens of various electronic client devices. For example, the database may store a first pixel map that may include first pixel data corresponding to a first electronic form displayed on a first device having a first screen size. The database may further store a second pixel map that may include second pixel data corresponding to the first electronic form displayed on the first device having a second screen size. Although, the first electronic form is displayed on a same device (such as the first device), but since the first device have different screen sizes, the pixel map corresponding to each first device may be different. For instance, the pixel map may be different when the same electronic form is displayed on different electronic devices (due to the screen sizes).

In a next step 208, the server may generate and transmit an instruction to the electronic client device. The instruction may include a message to transmit current pixel data. The current pixel data may include a pixel status of all pixels within the display area of the electronic client device when the electronic form is displayed on the user interface of the electronic client device. The electronic client device on receiving the message from the server may process a request within the message. The electronic client device may collect all current pixel data, and then transmit all the current pixel data to the server. In some embodiments, the electronic client device may execute pixel algorithms to determine all current pixel data, which is then transmitted to the server. The current pixel data may include a pixel status for each pixel at multiple pixel locations within the display area of the user interface of the electronic client device. The current pixel data may further include information associated with color and characters within the electronic form.

In a next step 210, the server may compare the current pixel data received from the electronic client data with the corresponding pixel data within the pixel map. The server may randomly select a pixel status of a first pixel at a first pixel location from the current pixel data. The server may then compare the pixel status of the first pixel at the first pixel location from the current pixel data with the pixel status of the corresponding first pixel at the corresponding first pixel location within the pixel map. The server upon determining that the current pixel data received from the electronic client data matches with the corresponding pixel data within the pixel map may conclude that the electronic form is fully displayed on the electronic client device.

In a next step 212, the server upon determining that the current pixel status does not match a pixel status of a corresponding pixel within the pixel map, the server may conclude that the electronic form is not fully displayed on the user interface of the electronic client device. In such a situation, the server may execute a second protocol having a set of instructions to refresh the webpage on the user interface of the electronic client device that is displaying the partial or incomplete electronic form. In response to the successful refreshing of the webpage, the server may then again determine whether the electronic form is fully displayed on the user interface of the electronic client device.

The server may determine a status of connectivity associated with the electronic client device. For instance, the server may determine whether the electronic client device is connected to a network. In some cases, the server may determine whether the electronic client device is connected to the webserver, which contains entire data of the electronic form. The server upon determining that the electronic client device is not connected to the network and/or the webserver may then execute instructions to facilitate network connection between the electronic client device and the webserver. When a successful network connection is established between the components of the system via the network, the server may then instruct the application running on the electronic client device to terminate the first protocol and execute a new protocol (for example, a second protocol having a series of computer executable instructions) to enable the display of the complete electronic form on a webpage displayed on the electronic client device. At the same time, the server may display a status bar on the user interface of the electronic client device.

The status bar may include a status message. The status message may indicate that a new webpage with the complete electronic form is loading. The status bar may further indicate an approximate time value associated with the execution of the second protocol and loading of the new webpage presenting the complete electronic form. After the approximate time period, the new webpage is loaded that results in display of the complete electronic form on the user interface of the electronic client device. The complete electronic form may include all of the inputs fields, which are configured to receive data from the electronic client device. When the user submits data in the input fields of the electronic form, the server then stores the inputted data in the database. In some embodiments, the server may pre-populate the data within the input fields of the electronic form based on user record stored in the database. For example, the input fields may have a field for contact information of the user. The server may retrieve the contact information of the user from the user record, and then pre-populate said field with retrieved contact information of the user. The user will then approve or amend the pre-populated data within the input field, which is then stored in the database.

Figure 3A:
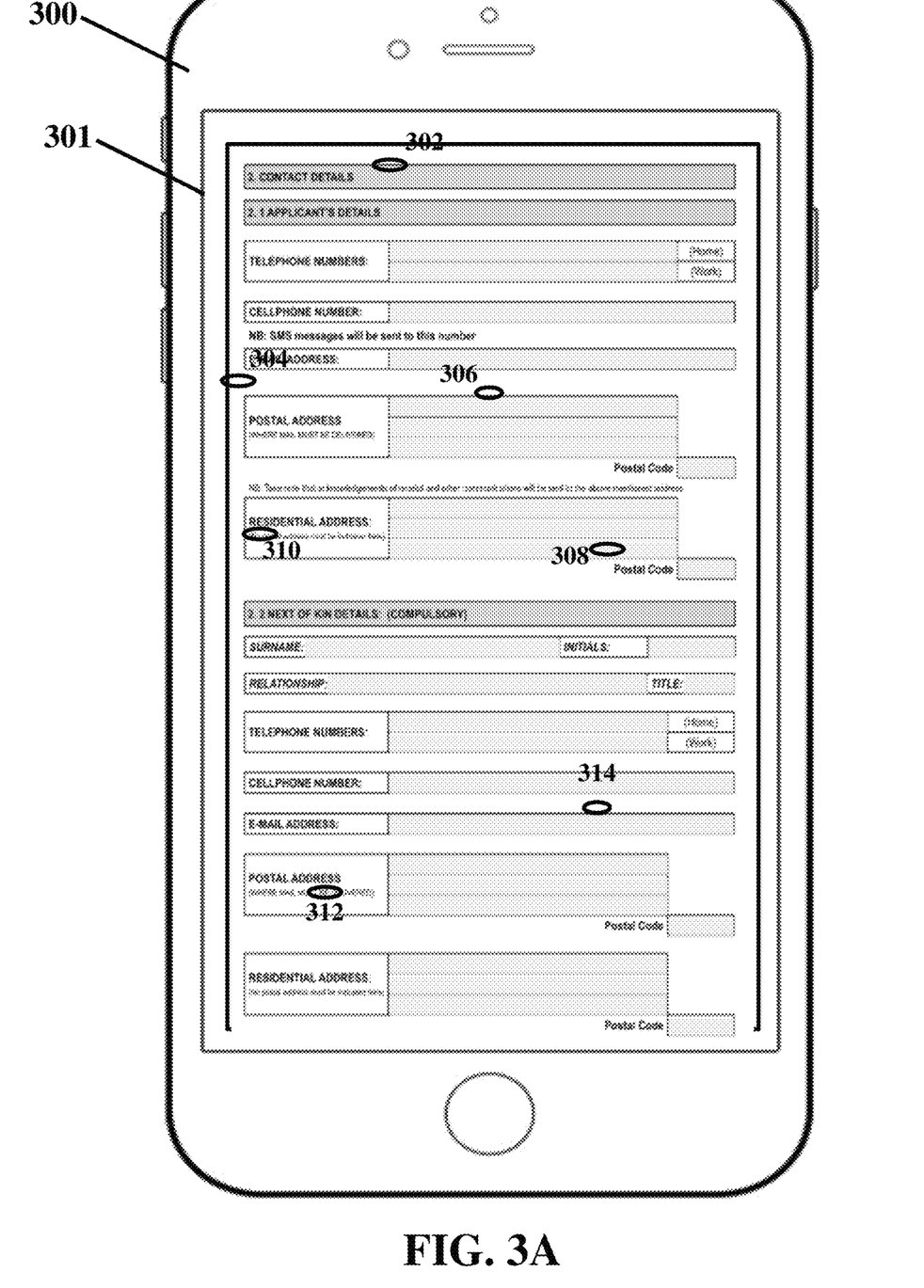
FIG. 3A shows a graphical user interface showing a webpage executed on a mobile device of a user, according to an embodiment.
Figure 3B:
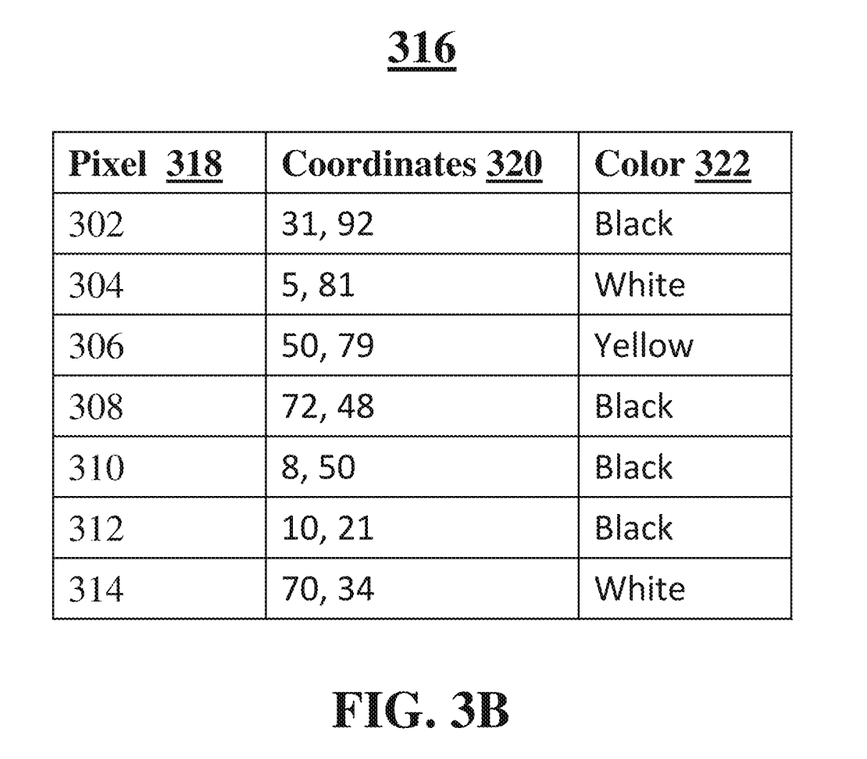
FIG. 3B shows a table of a pixel map, according to an embodiment.

FIG. 3A shows a graphical user interface 301 showing a webpage executed on a mobile device 300 of a user. The webpage may display an electronic form. The electronic form may include various fields, such as contact details, applicant details, telephone numbers, cellphone numbers, email addresses, and residential addresses. A table 316, shown in FIG. 3B, shows a pixel map. The pixel map is stored in a database. The pixel map is associated with the mobile device 300, a size of display portion of the mobile device 300, and/or the electronic form. The pixel map may contain various fields, such as a pixel field 318, a coordinate field 320, and a color field 322. The pixel field 318 may include a list of various pixels 302, 304, 306, 308, 310, 312, 314 at various pixel locations within the electronic form. Each pixel in the pixel field 318 may have a location coordinate mentioned in the corresponding coordinate field 320 since location of each pixel in the electronic form is uniquely defined by its coordinates.

There may be multiple techniques to specify the pixel coordinates. One technique may use a linear offset technique and another technique is an axis coordinate technique. The linear offset technique is a sequential number ranging from 1 to a total number of pixels in the electronic form. The axis coordinates technique define the pixel location as an array in a multi-dimensional space. Each electronic form axis has a length, in pixels, so that the electronic form coordinates run between 1 and a length of the axis. The total number of pixels in the electronic form equals the product of the axis length for all electronic form axes. Each pixel in the pixel field 318 may have a corresponding color data mentioned in the color field 322.

Figure 4A:
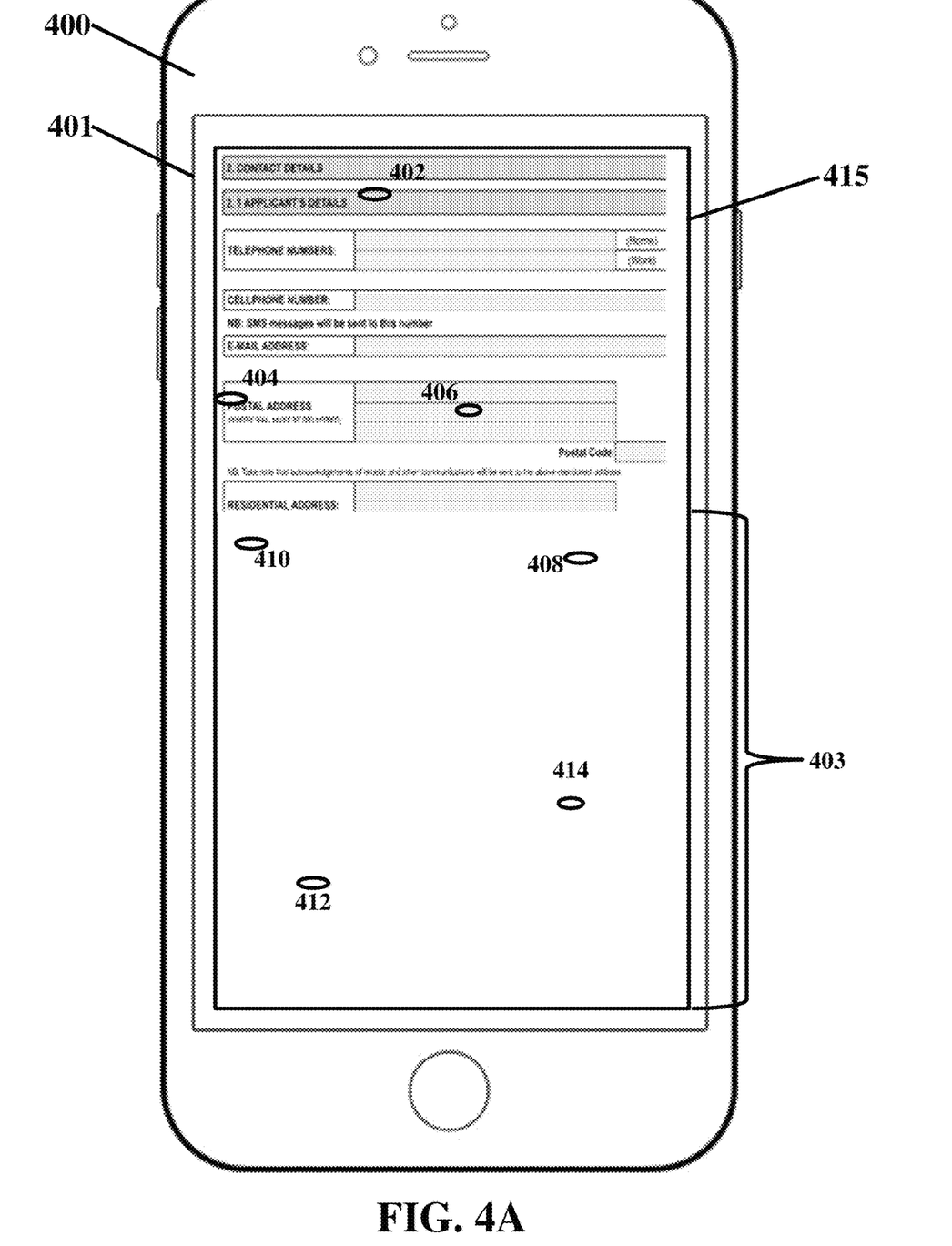
FIG. 4A illustrates a graphical user interface showing a webpage loading on a mobile device of a user, according to an embodiment.

FIG. 4A illustrates a graphical user interface 401 showing a webpage loading on a mobile device 400 of a user. The webpage may present an electronic form 415. The electronic form 415 may include various input fields, such as contact details, applicant details, telephone numbers, cellphone numbers, email addresses, and residential addresses. In this example, the electronic form 415 has not fully loaded on the mobile device 400, as shown by region 403.

In order to determine whether the electronic form 415 is fully or partially displayed on the graphical user interface 401, a server may retrieve pixel data associated with the electronic form 415. The pixel data may contain a list of various pixels 402, 404, 406, 408, 410, 412, 414 at various pixel locations within the electronic form. The server may further retrieve a pixel map (as shown in the FIG. 3B) from the database. The pixel map is associated with the mobile device 400, a size of the mobile device 400, and/or the electronic form 415. The server may randomly select a pixel, for example, a pixel 410. The server may select a corresponding pixel 310 from the pixel map. The serve may compare the information associated with the pixel 410 and the pixel 310. When information associated with the pixel 410 and the pixel 310 does not match, the server may determine that the electronic form 415 is partially displayed on the graphical user interface 401. For instance, the pixel 410 may correspond to the pixel 310 and according to the pixel map, the pixel 410 must be black. However, due to the technical problems (e.g., improper display of electronic form 415), the pixel 410 is not black.

Figure 4B:
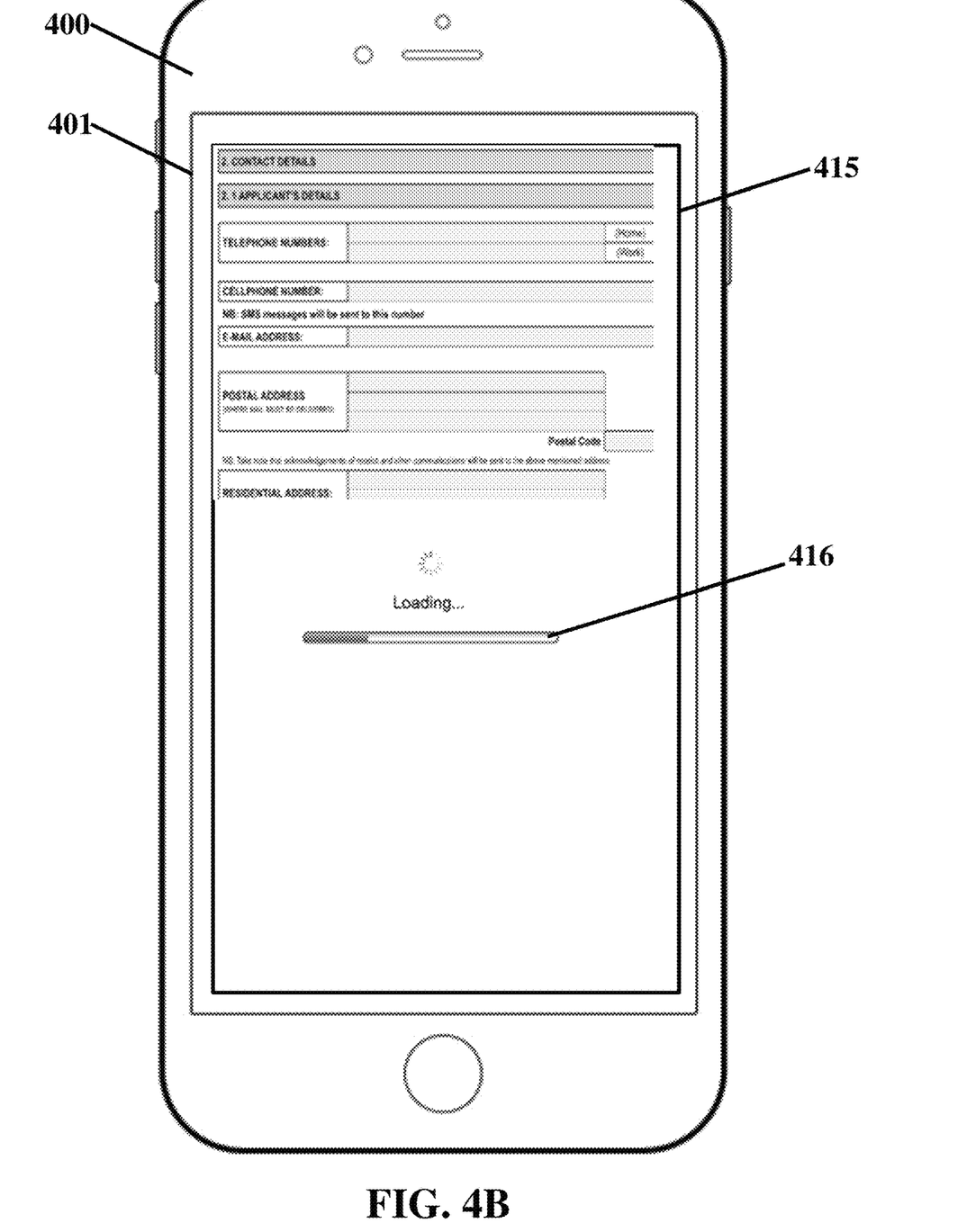
FIG. 4B illustrates a graphical user interface showing a webpage loading on a mobile device of a user, according to an embodiment.
Figure 4C:
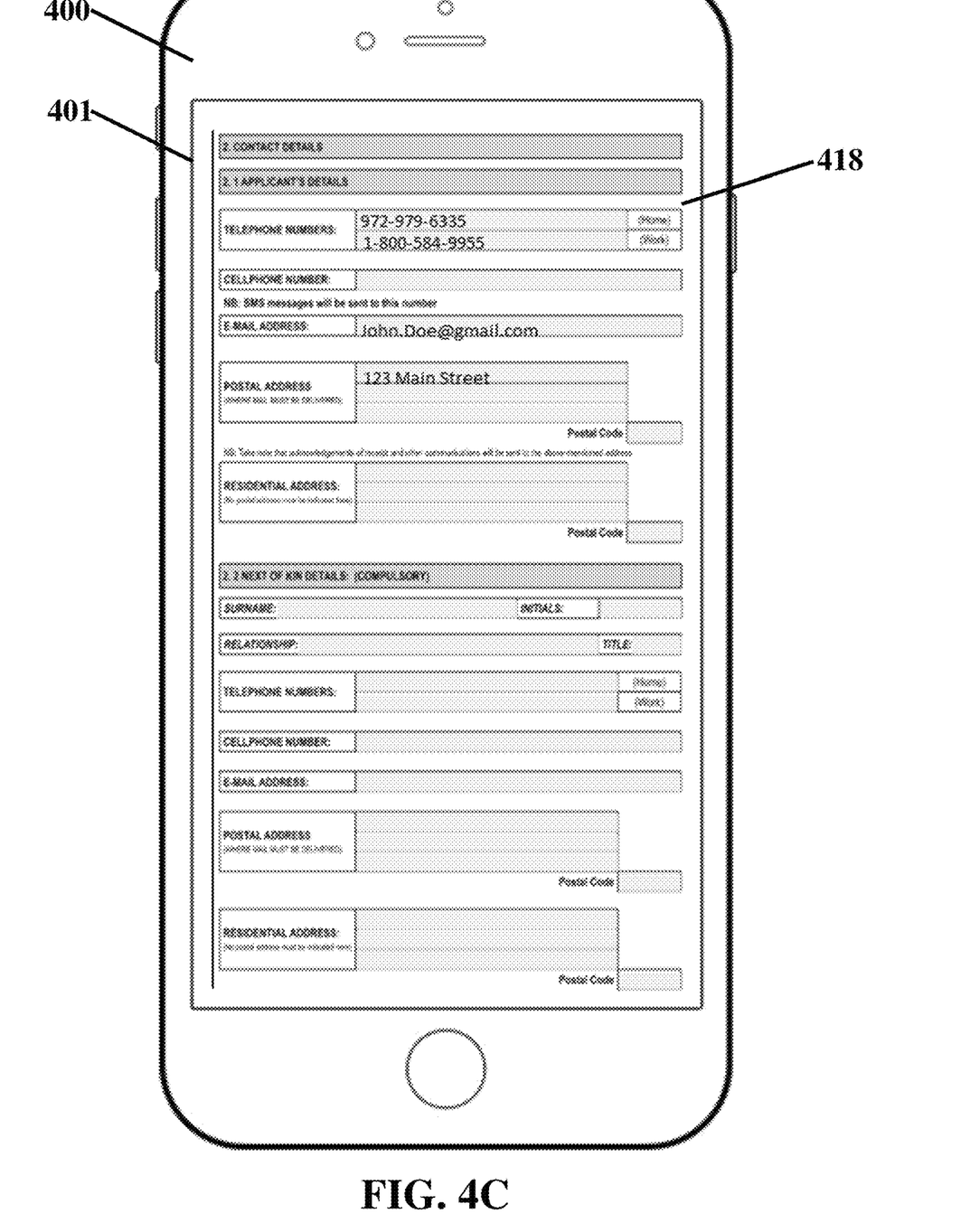
FIG. 4C illustrates a graphical user interface showing a webpage loading on a mobile device of a user, according to an embodiment.

In such a situation, the server may display a status bar 416 on the graphical user interface 401, as depicted in FIG. 4B. The status bar 416 may indicate a message "loading." The server may generate and execute instructions to reload and/or refresh the webpage on the graphical user interface 401. Upon reloading/refreshing of the webpage, a complete electronic form 418 is displayed on the graphical user interface 401. As described above, the server may also prepopulate the electronic form 418 using inputs previously inputted by the user or other relevant user data. For instance, the server may retrieve user data from the database to prepopulate the electronic form 418. In some embodiments, the user may have inputted one or more input responses before the display of the electronic form 418 malfunctioned. The one or more input responses may be stored in the database. The server may retrieve the inputted responses from the database, and prepopulate the fully displayed electronic form 418 with said responses to provide a more user-friendly experience, as illustrated in FIG. 4C.

Non-Limiting Example

A server may monitor execution and proper display of a media element (e.g., a portion of an electronic form) on a mobile device. The server may first receive a notification, which may indicate that the mobile device has executed a first protocol instructing a browser of the mobile device to display the electronic form. The first protocol may be a set of instructions transmitted to the mobile device by a webserver where the first protocol instructs the browser of the mobile device to display the electronic form. Upon receiving the notification, from the mobile device, the server may retrieve a pixel map associated with the electronic form purportedly displayed on the mobile device. The pixel map may include a list of pixel coordinates and their corresponding attributes (e.g., color) when the electronic form is fully displayed on the browser of the mobile device. The pixel map is unique to the electronic form and the mobile device (based on the unique attributes of the electronic form and the display size of the mobile device). Upon retrieving the pixel map, the server may instruct the mobile device to transmit a pixel status of one or more pixels within its display area. In response to receiving the pixel status from the mobile device, the server may compare the pixel status with the pixel map to determine whether the electronic form is fully displayed on the mobile device. When the server may determine that the electronic form is not fully displayed, the server may execute a second protocol by instructing the mobile device to refresh the electronic form or reconfigure its connection settings.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   receiving, by a server from an application executing on an electronic client device having a display area, an indication of execution, by a webserver communicatively coupled to the server, of a first protocol configured to display a plurality of media elements on a webpage comprising an electronic form displayed on the electronic client device, wherein at least some of the media elements represent a section of the electronic form or fields of the electronic form;
   retrieving, by the server from a database based on a size of the display area of the electronic client device, a pixel map unique to the plurality of media elements and the display area, the pixel map indicating a pixel status of each pixel within a set of pixels of the display area when the display area displays the plurality of media elements, wherein the pixel map is unique to a dimensional attribute of the display area;
   upon receiving the indication of execution of the first protocol, generating, by the server, an instruction to transmit pixel statuses of pixels at a plurality of pixel locations within the display area, and transmitting the instruction to the electronic client device;
   upon transmitting the instruction to the electronic client device, receiving, by the server, the pixel statuses of the pixels at the plurality of pixel locations;
   comparing, by the server, a color attribute of the received pixel statuses of the pixels at the plurality of pixel locations of the electronic client device and a color attribute of the pixel statuses of corresponding pixels within the pixel map from the database; and
   upon determining that the color attribute of one or more of the received pixel statuses does not match the color attribute of the pixel status of a corresponding pixel within the pixel map, determining, by the server, a portion of the electronic form that is not fully displayed by the electronic client device, including determining, by the server, which of the media elements are not fully displayed on the electronic client device, and instructing the application to cause the electronic client device to request the webserver to re-execute the first protocol to display the plurality of media elements on a webpage displayed on the electronic client device.

2. The method of claim 1, further comprising displaying, by the server, a status bar while the application is instructed to re-execute the first protocol.

3. The method of claim 2, wherein the status bar corresponds to a time value associated with re-execution of the first protocol.

4. The method of claim 1, upon determining that one or more of the pixel statuses does not match the color attribute of the pixel status of a corresponding pixel within the pixel map, further comprising determining, by the server, a list of the media elements that are not fully displayed on the electronic client device.

5. The method of claim 1, further comprising identifying, by the server, the display area of the electronic client device.

6. The method of claim 1, further comprising identifying, by the server, the application to terminate execution of the first protocol.

7. The method of claim 1, further comprising instructing, by the server, the application to refresh the webpage.

8. The method of claim 1, wherein the plurality of media elements represent a plurality of inputs fields configured to receive data from the electronic client device.

9. The method of claim 8, further comprising storing, by the server, data corresponding to at least one input field of the plurality of inputs fields received from the electronic client device.

10. The method of claim 9, further comprising pre-populating, by the server, at least one input field based on the data stored upon re-execution of the first protocol.

11. A system comprising:
    a database;
    an electronic client device; and
    a server configured to:
      receive from an application executing on the electronic device having a display area, an indication of execution, by a webserver communicatively coupled to the server, of a first protocol configured to display a plurality of media elements on a webpage comprising an electronic form displayed on the electronic device, wherein at least some of the media elements represent a section of the electronic form or fields of the electronic form;
      retrieve from the database, based on a size of the display area of the electronic client device, a pixel map unique to the plurality of media elements and the display area, the pixel map indicating a pixel status of each pixel within a set of pixels of the display area when the display area displays the plurality of media elements wherein the pixel map is unique to a dimensional attribute of the display area;
      upon receiving the indication of execution of the first protocol, generate an instruction to transmit pixel statuses of pixels at a plurality of pixel locations within the display area, and transmit the instruction to the electronic client device;

upon transmitting the instruction to the electronic client device, receive the pixel statuses of the pixels at the plurality of pixel locations;

compare a color attribute of the received pixel statuses of the pixels at the plurality of pixel locations of the electronic client device and a color attribute of the pixel statuses of corresponding pixels within the pixel map from the database; and upon determining that the color attribute of one or more of the received pixel statuses does not match the color attribute of the pixel status of a corresponding pixel within the pixel map, determine a portion of the electronic form that is not fully displayed by the electronic client device, including which of the media elements are not fully displayed on the electronic client device, and instruct the application to cause the electronic client device to request the webserver to re-execute the first protocol to display the plurality of media elements on a webpage displayed on the electronic client device.

12. The system of claim 11, the server is further configured to display a status bar while the application is instructed to re-execute the first protocol.

13. The system of claim 12, wherein the status bar corresponds to a time value associated with re-execution of the first protocol.

14. The system of claim 11, wherein the server is further configured upon determining that one or more of the pixel statuses does not match the color attribute of the pixel status of a corresponding pixel within the pixel map, to determine a list of the media elements that are not fully displayed on the electronic client device.

15. The system of claim 11, wherein the server is further configured to identify the display area of the electronic client device.

16. The system of claim 11, wherein the server is further configured to identify the application to terminate execution of the first protocol.

17. The system of claim 11, wherein the server is further configured to instruct the application to refresh the webpage.

18. The system of claim 11, wherein the plurality of media elements represent a plurality of inputs fields configured to receive data from the electronic client device.

19. The system of claim 18, wherein the server is further configured to store data corresponding to at least one input field of the plurality of inputs fields received from the electronic client device.

20. The system of claim 19, wherein the server is further configured to pre-populate at least one input field based on the data stored upon re-execution of the first protocol.

* * * * *